United States Patent [19]
Grimm

[11] Patent Number: 5,785,158
[45] Date of Patent: Jul. 28, 1998

[54] BRAKE APPARATUS WITH FUNCTIONAL INTEGRITY MONITOR

[75] Inventor: Duane H. Grimm, Rockford, Ill.

[73] Assignee: Sundstrand Corporation, Rockford, Ill.

[21] Appl. No.: 595,157

[22] Filed: Feb. 1, 1996

[51] Int. Cl.⁶ ........................................ B60T 8/72
[52] U.S. Cl. ........................... 088/181 T; 188/134
[58] Field of Search .................. 188/181 T, 134, 188/158, 71.5, 72.3, 72.8; 192/8 R, 9, 121, 129, 130, 131, 862.08, 862.17, 862.191, 862.23, 862.321, 862.325

[56] References Cited

U.S. PATENT DOCUMENTS

| | | | |
|---|---|---|---|
| 2,403,952 | 7/1946 | Ruge | 73/862.325 |
| 3,693,770 | 9/1972 | Charchian et al. | 192/30 W |
| 3,701,401 | 10/1972 | Palma et al. | 188/134 |
| 4,597,480 | 7/1986 | Schwarz | 192/54 |
| 4,625,843 | 12/1986 | Maltby et al. | 192/8 R |
| 4,762,205 | 8/1988 | Ortman | 188/71.2 |
| 5,131,268 | 7/1992 | Dillmann | 73/121 |

*Primary Examiner*—Robert J. Oberleitner
*Assistant Examiner*—C. T. Bartz
*Attorney, Agent, or Firm*—Lawrence E. Crowe

[57] ABSTRACT

The problem of verifying functional readiness of a braking apparatus including: a brake plate rotatable about an axis; an armature and a reaction plate disposed on opposite sides of the brake plate; and an actuator for urging the armature to clamp the brake plate between the armature and the reaction plate in a manner generating braking torque acting on the brake plate with respect to the armature and reaction plate for resisting rotation of the brake plate, is solved by providing an integral brake integrity monitoring apparatus. The brake integrity monitoring apparatus includes features for reacting the brake torque directly against one or more calibrated springs, as the brake is applied, to generate a calibrated relative rotation of the armature with respect to the reaction plate. The amount of relative rotation of the armature and/or reaction plate caused by the braking torque acting against a reacting torque generated by the springs provides a direct measurement of braking torque. The relative rotation between the armature and the reaction plate is measured with a proximity sensor and compared to a reference value of relative rotation corresponding to a minimum functional value of braking torque for a properly functioning brake apparatus, to verify that the brake is producing the minimum required torque. In alternate embodiments, relative rotation is generated and measured between the braking apparatus and a support structure operatively connected to the braking apparatus.

20 Claims, 2 Drawing Sheets

BRAKE APPARATUS WITH FUNCTIONAL INTEGRITY MONITOR

TECHNICAL FIELD

This invention relates to braking devices, and more particularly to an apparatus and method for monitoring the functional performance capability of the brake.

BACKGROUND

Many rotating mechanical transmission systems rely on torsional brakes to decelerate, stop, or hold a shaft or other rotatable element of the transmission system. An aircraft flight control surface actuation system is an example of such a mechanical transmission system. Such flight control actuation systems are typically constructed with ball-screws, precisely machined gear drives, or other drive components that are designed to be relatively efficient, and produce little inherent friction.

In order to hold such efficient drive systems in a given commanded position, it is often necessary to provide one or more torsional brakes which engage when the drive system is inoperative to maintain the position of elements driven by the drive system. Torsional brakes are also utilized as safety devices which engage to hold the drive system in position, should a failure, such as a broken drive shaft, occur in the drive system.

In an aircraft flight control surface actuation system, for example, if the drive system efficiency is high enough to be reversible, or if the system should fail in flight, aerodynamic loads acting on the control surfaces can in some instances, backdrive the system and move the control surface to a dangerous uncommanded position. To preclude the possibility of such an occurrence, it is standard practice to include torsional brakes in such flight control surface actuation systems.

Because the proper functioning of torsional brakes in such drive systems is so critical to proper operation of the control surface actuation system, and to the safe operation of the aircraft, it is highly desirable to be able to verify that the brakes will perform reliably when they are called upon to decelerate, stop, or hold a portion of the drive system. Ideally, the brake would be momentarily operated during a pre-flight check, for instance, in a manner allowing its torque producing capability to be directly measured.

Prior brake functional integrity monitoring systems, on aircraft or otherwise, have not proved to be entirely satisfactory, however. A typical torsional brake includes: a brake plate attached to a shaft or other rotating member; an armature and a reaction plate located on opposite sides of the brake plate; and a solenoid or other actuator means for causing the armature to move axially and clamp the brake plate between the armature and the reaction plate. As the brake plate is clamped, braking torque is generated between the brake plate, and the armature and reaction plate, for stopping or holding the rotating member.

In one prior brake integrity monitoring approach, functional verification is checked by manually measuring brake torque during assembly or initial installation of the brake, and at periodic intervals thereafter. Such manual inspections may require partial disassembly of the drive system to allow access for attachment of test equipment. Even where such disassembly is not required, manual monitoring does not provide the high degree of reliability and convenience required to be a viable solution to meeting the stringent reliability requirements for drive systems such as an aircraft flight control system.

In another prior approach, axial movement of the armature is directly measured as an indicator of brake wear and proper functioning of the actuator means. This approach has two major drawbacks. First, brake torque is not measured directly, or even indirectly. Second, the typical axial movement for total engagement of the brake is very small, on the order of 0.002 to 0.010 inches. This range of movement is less than commonly available sensors can reliably detect. As a result, it is very difficult and costly to provide position sensing means accurate enough to give any reliable indication of armature position.

In yet another prior approach, the brake torque is indirectly monitored by momentarily applying the brake during an operational test, and monitoring the change in input power to the drive system when the brake is applied. The brake torque is then calculated as a function of measured input power and compared to a minimum required value to verify functional readiness. While such an indirect approach does result in obtaining a value for brake torque, a fairly complex monitoring system is required. Furthermore, since torque is only indirectly monitored, a rather sophisticated and costly monitoring system is required to discriminate between actual changes in brake functionality and other intervening factors such as component accuracy, noise, or drift in the operational characteristics of the monitoring system itself.

It is an object of my invention, therefore to provide an improved braking device having a braking apparatus that includes integral means for verifying functional readiness of the braking device. Other objects include:

1. providing a brake integrity monitor that directly senses brake torque, with a minimal number of additional parts;
2. providing such a brake integrity monitor that does not require disassembly of the drive system in order to verify brake performance;
3. providing a brake integrity monitor of straightforward construction that can be produced at low cost, and is small in size and weight; and
4. providing a brake integrity monitor and method of operation that is suitable for use in aircraft actuation systems.

SUMMARY

My invention provides such an improved braking device by incorporating means for reacting the brake torque directly against calibrated springs, as the brake is applied while the drive system is operating, to generate a calibrated relative rotation between components of the braking device. The amount of relative rotation between the components caused by the braking torque acting against the reacting torque of the spring means thus provides a direct measurement of braking torque. The measured relative rotation is then compared to a known minimum functional value for a properly functioning brake to verify that the braking device is producing the minimum required torque.

The spring means of my invention are judiciously selected to allow a limited circumferential relative motion of about 0.100 inch, as the armature moves axially the 0.002–0.010 inches required for full engagement. By virtue of the relatively long—0.100 inch—motion created, a variety of simple, low cost, sensing devices, such as proximity sensors or Hall-effect sensors, can be utilized to verify functional performance of the brake. The 0.100 relative rotation prior to full engagement of the brake is small enough, however, that brake function and reliability are essentially unaffected by the operation of the brake integrity monitor of my invention.

The brake integrity monitor of my invention therefore provides an apparatus and method for directly measuring brake torque, and verifying functional readiness of the brake in a more straightforward and reliable manner than prior monitoring systems.

These and other aspects and advantages of my invention will be apparent to those having skill in the art upon consideration of the following drawing figures and detailed descriptions of exemplary embodiments of my invention.

DESCRIPTION OF THE INVENTION

Figure 1:
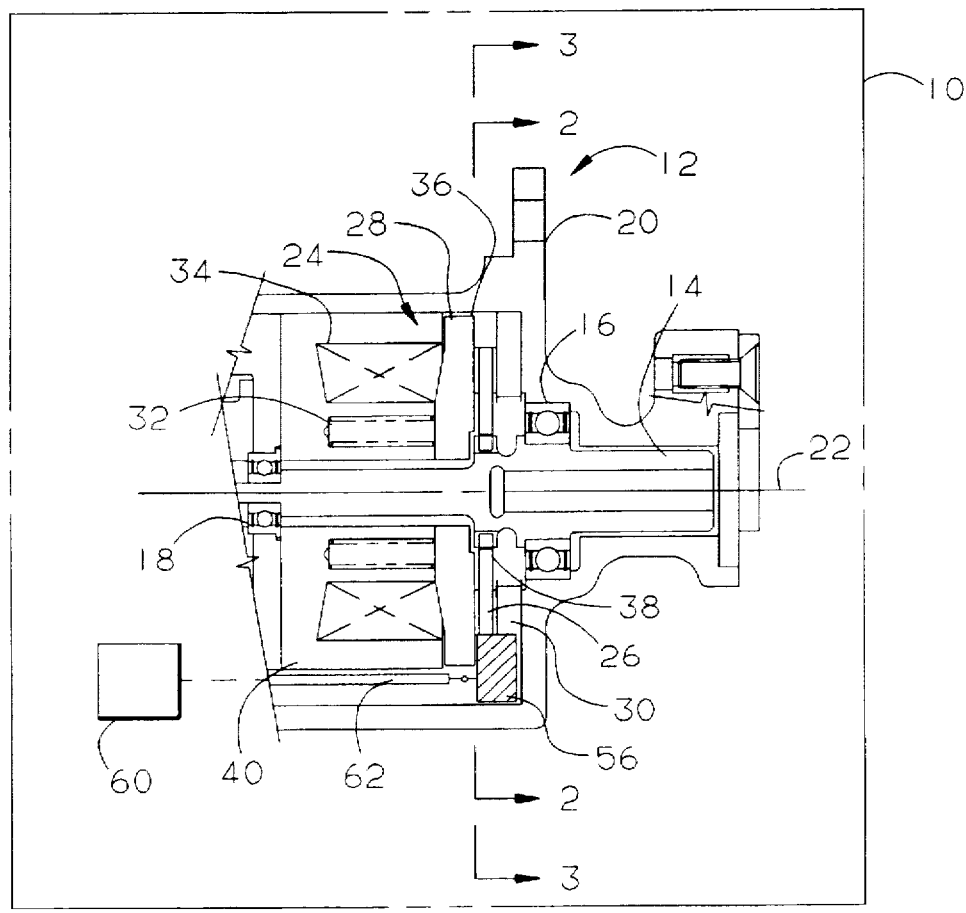
FIG. 1 is a longitudinal cross-section of an exemplary embodiment of a braking apparatus including a brake integrity monitoring device according to my invention.

FIG. 1 depicts an exemplary embodiment of my invention in the form of a drive system 10 including a braking device 12 having a rotatable member in the form of a shaft 14 mounted by bearings 16, 18 in a support structure, in the form of a housing 20 for rotation relative to the housing 20 about an axis 22. The braking device 12 includes a braking apparatus generally indicated as reference numeral 24.

The braking apparatus 24 includes a brake plate 26 operably connected to the shaft 14 to be rotatable therewith about the axis 22. An armature 28 and a reaction plate 30 are disposed on opposite sides of the brake plate 26. Actuator means in the form of a helical compression spring 32 are provided for urging the armature 28 to clamp the brake plate 26 between the armature 28 and the reaction plate 30 in a manner generating a braking torque acting on the brake plate 26 with respect to the armature 28 and the reaction plate 30, for resisting rotation of the brake plate 26 and the shaft 14. Further actuator means in the form of a solenoid coil 34 are provided for pulling the armature 28 away from the brake plate 26 to release the braking apparatus 24 and allow the shaft 14 to be rotated about the axis 22.

Specifically, in the embodiment depicted in FIG. 1, the reaction plate 30 is disposed about the shaft 14 and operably connected to the housing 20 by means of screws, or other such fastening means (not shown), in a manner preventing the reaction plate 30 from moving axially or rotating relative to the housing 20, along or about the axis 22. The armature 28 is disposed about the shaft 14 and operably connected to the housing 20 by piloting means, as indicated at 36, in a manner allowing the armature 28 to rotate and move axially relative to the housing 20 about and along the axis 22. The brake plate 26 is axially disposed between the reaction plate 30 and the armature 28, and operably connected to the shaft 14 by means of a spline connection 38, in a manner constraining the brake plate 26 to rotate with the shaft 14, but allowing the brake plate 26 to move axially along the spline connection 38 with respect to the shaft 14. The spring 32 and solenoid coil 34 of the actuator means are mounted in a carrier 40 disposed about the shaft 14 in close axial proximity to the armature 28, at a face thereof opposite the brake plate 26. The actuation means carrier 40 is operably connected to the housing 20 in a manner constraining the carrier 40 from rotating or moving axially with respect to the housing 20 about or along the axis 22. To ensure rapid engagement and disengagement, the braking apparatus 24 of the embodiment depicted in FIG. 1 is configured such that an axial movement of the armature 28 equal to about 0.002 to 0.010 inches will result in complete engagement or disengagement of the brake plate 26 with the armature 28 and reaction plate 30.

Figure 2:
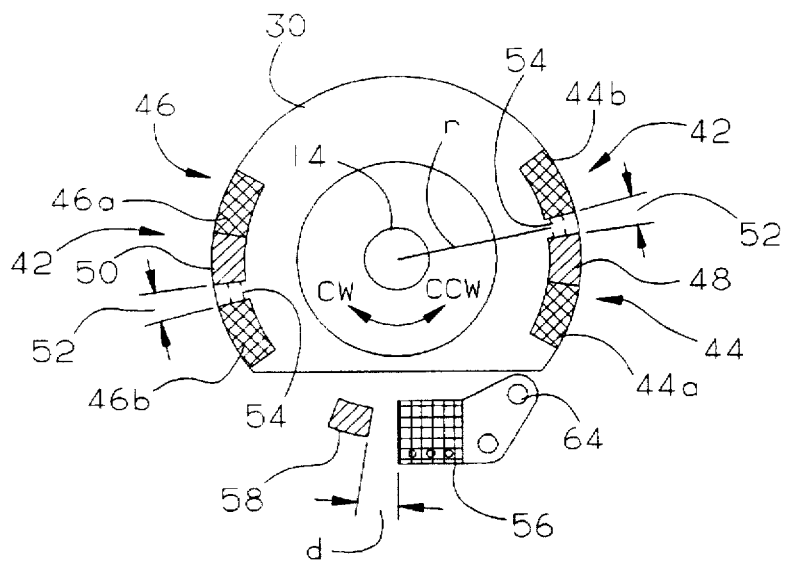
FIGS. 2 and 3 are sectional views taken respectively along lines 2—2 and 3—3 of FIG. 1, illustrating portions of two alternate embodiments of a brake integrity device according to my invention.

The braking apparatus 24 further includes means for providing a calibrated relative rotation of the armature 28 with respect to the reaction plate 30 about the axis 22 in response to the braking torque acting on the brake plate 26 when the spring 32 of the actuator means is urging the armature 28 to clamp the brake plate 26 between the armature 28 and the reaction plate 30. Specifically, as shown in FIG. 2, the means for providing calibrated relative rotation 42 includes a first and second pair 44, 46 of circumferentially spaced first lugs 44a, 44b, 46a, 46b extending axially from the reaction plate 30 toward the armature 28. A pair of second lugs 48, 50 extend axially from the armature 28 towards the reaction plate 30. One of the second lugs 48 extending from the armature 28 is disposed between the first pair of lugs 44a, 44b extending from the reaction plate 30. The second lug 50 extending from the armature 28 is disposed between the second pair of lugs 46a, 46b extending from the reaction plate 30. The circumferential length and spacing of the first and second lugs of the means for providing calibrated rotation 42 are configured such that when the second lugs 48, 50 are in contact with one of the first lugs 44a, 46a, respectively, a backlash space 52 of about 0.100 to 0.150 inches will be provided between the second lugs 48, 50, and their respective other first lugs 44b, 46b. A pair of helical compression springs 54 are disposed and operably connected between the second lug 48 and the first lug 44b, and between the second lug 50 and the first lug 46b, in a manner urging the second lug 48 into contact with the first lug 44a and the second lug 50 into contact with the first lug 46a. This contact between the first lug 44a and second lug 48, and the first lug 46a and second lug 50, respectively, thereby defines an initial predetermined rotational reference position of the armature 28 relative to the reaction plate 30. The springs 54, therefore, each have a first end thereof operably attached to one of the first lugs 44b, 46b, and a second end thereof operably connected to one of the second lugs 48, 50, in such a manner that the springs 54 urge the second lugs 48, 50 into contact respectively with the first lugs 44a, 46a when the spring 32 of the actuator means is not urging the armature 28 and reaction plate 30 to clamp the brake plate 26. The springs 54 are, therefore, also operatively connected for resisting relative motion between the armature 28 and the reaction plate 30 in a counterclockwise direction as depicted in FIG. 2. The springs 54 are configured to provide a predetermined calibrated spring rate that is proportional to relative motion between the armature 28 and the reaction plate 30 in the counterclockwise direction as depicted in FIG. 2.

The braking apparatus 24 further includes means for measuring the calibrated relative rotational position between the armature 28 and the reaction plate 30, in the form of a proximity sensor 56, a position sensor reference lug 58 extending axially from the armature 28 toward the reaction plate 30, and a signal processing unit 60 operably connected by wires 62 to the proximity sensor 56. In the exemplary embodiment depicted in FIGS. 1 and 2, the proximity sensor 56 is a Hall-effect transducer operatively connected to the housing 20 by means of fasteners 64, or a bonding agent such as an epoxy adhesive, in a manner constraining the proximity sensor 56 from moving either rotationally or axially with respect to either the housing 20 or reaction plate 30, about or along the axis 22. When supplied with a voltage input from the signal processing unit 60, the Hall-effect transducer 56 will respond electrically, in a known manner, to variations in the relative rotational position of the reference lug 58 with respect to the transducer 56, and produce a voltage output to the signal processing unit 60 that is proportional to the proximity 'd' of the reference lug 58 to the transducer 56.

For the embodiment depicted in FIGS. 1 and 2, functional integrity of the braking apparatus 24 is verified by the following method. First, the solenoid coil 34 is energized to pull the armature 28 to the left, as depicted in FIG. 1, to thereby release the brake plate 26, and allow the shaft 14 to be rotated about the axis 22. The shaft 14 is then driven about the axis 22 at a predetermined rotational speed in the counterclockwise direction as depicted in FIG. 2. The braking apparatus 24 is then applied by removing power from the solenoid coil 34, such that the spring 32 of the actuator means will drive the armature 28 to the right as depicted in FIG. 1, and clamp the brake plate 26 between the armature 28 and the reaction plate 30. As the brake plate 26 is clamped between the armature 28 and the reaction plate 30, braking torque is generated between the brake plate 26 and the armature 28 and reaction plate 30. The braking torque generates drag forces on the armature 28 tending to rotate the armature 28 in a counterclockwise direction. Because the reaction plate 30 is fixed against rotation to the housing 20, any rotation of the armature 28 about the axis 22 in response to the drag force created by the brake plate 26 will result in relative rotational movement between the armature 28 and the reaction plate 30.

The springs 54 are disposed to resist such relative rotational motion between the armature 28 and the reaction plate 30. By virtue of the fact that the springs 54 are disposed at a radial distance 'r' outward from the axis 22, the force generated by the springs 54 results in a reaction torque which opposes motion of the armature 28 resulting from braking torque exerted on the armature 28 by the brake plate 26. When the braking apparatus 24 is operating properly, the brake torque generated when the brake is applied will overcome the reaction torque provided by the springs 54, and cause the armature to rotate with the brake plate 26 in the counterclockwise direction against the calibrated reaction torque generated by the springs 54 to partially close the backlash 52 between the first lugs 44b, 46b and the second lugs 48, 50 respectively.

Any relative rotational movement between the armature 28 and the reaction plate 30 will cause a corresponding relative rotational movement between the position sensor reference lug 58 attached to the armature, and the proximity sensor 56 attached to the housing 20. The proximity sensor 56 generates an output signal proportional to the change in relative position between the reference lug 58 and the sensor 56, which is communicated via the wires 62 to the signal processing unit 60. The signal processing unit 60 compares the measured value of relative rotation, as indicated by the output signal from the proximity sensor 56, to a predetermined reference output signal corresponding to a minimum functional torque capacity of the braking apparatus for the predetermined rotational speed. If the measured value exceeds the predetermined minimum reference value, the brake is operating correctly. If it does not exceed the minimum value, the brake needs to be removed for repair and maintenance.

In certain drive systems wherein the torque producing capability of the drive system is sufficiently large to override the braking torque produced, the following alternate method can also be utilized for verifying functional integrity of the brake. First, the brake is applied by de-energizing the solenoid coil 34, thereby allowing the spring 32 to force the armature 28 to the right to clamp the brake plate 26 against the reaction plate 30, to resist rotation of the brake plate 28 and shaft 14 about the axis 22. Sufficient torque is then applied to the shaft 14 by the drive system to essentially "slip" the brake and rotate the shaft 14 a predetermined rotational distance, one revolution for example, about the axis 22. Slipping the brake causes relative motion between the brake plate 26 and the reaction plate 30. This relative motion generates braking torque between the armature 28 and the brake plate which drags the armature 28 along, thereby creating a calibrated relative rotation between the armature 28 and the reaction plate 30, by virtue of the action of the means for creating relative rotation, in the same manner as described above with respect to the previously described method. The relative motion created is then measured and compared to reference values to verify brake functional integrity, in the same manner as described above. Following the verification check, the drive system can slip the brake in the opposite direction, through the predetermined rotational distance, to return the shaft 14 to its previous position.

From the foregoing description, those having skill in the art will readily recognize that my invention overcomes problems encountered in prior braking devices by providing an improved brake integrity monitor and method for directly measuring the braking torque to verify functional readiness of the brake, in a straightforward manner requiring a minimum number of additional parts that can be fabricated at significantly lower cost and provide better performance than prior brake integrity monitors. Those having skill in the art will also recognize that the apparatus and method of my invention can be readily incorporated into aircraft actuation system hardware, and equipment operational procedures.

Figures 3, 5:
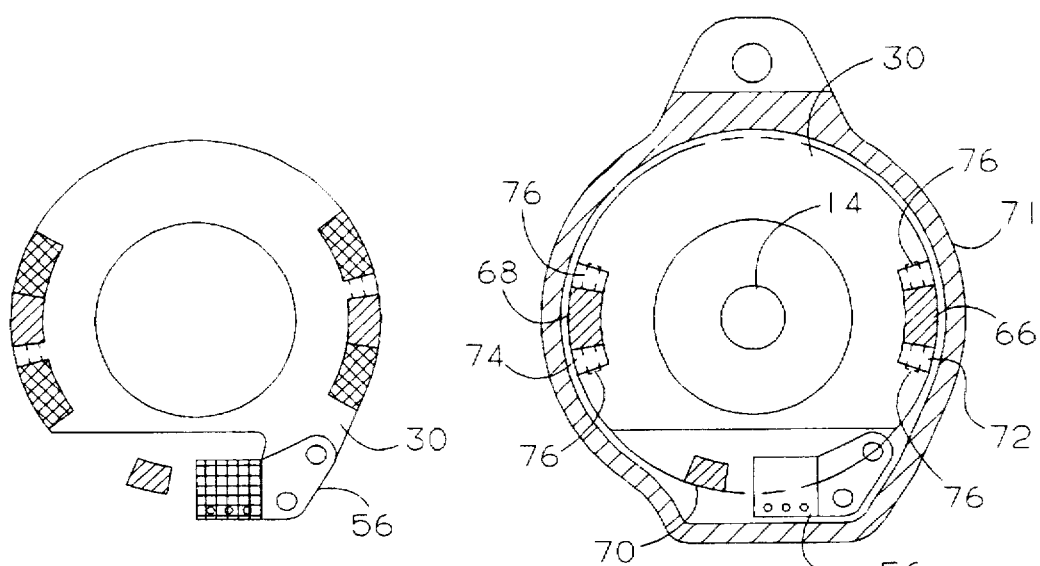
FIG. 5 is a cross-sectional view taken along line 5—5 of FIG. 4, illustrating the detailed construction of several of the components of the alternate embodiment depicted in the braking apparatus of FIG. 4.

Those having skill in the art will further recognize that although I have described my invention herein with respect to specific embodiments and applications thereof, many other embodiments and applications of my invention are possible within the scope of my invention, as described in the appended claims. For example, in other embodiments of a braking device 12 according to my invention, the proximity sensor 56 may be attached directly to the reaction plate 30 rather than the housing 20, as shown in FIG. 3.

Many types of sensors other than the Hall-effect sensor 56 described herein may be utilized to measure the relative rotation between the armature 28 and the reaction plate 30. For example, a resolver could be mounted on the housing 20 and operably connected by means of a geartrain arrangement to the armature 28 to provide a means for measuring the calibrated relative rotation between the armature 28 and the reaction plate 30. Because the relative rotation produced by my invention is on the order of 0.100–0.150 inches, manual inspection with the naked eye can also be used.

A torsional spring having a first end connected to the armature and a second end connected to the reaction plate could be utilized in place of the helical compression springs 54. My invention is also applicable in braking devices having multiple brake plates and reaction plates.

The range of activating means that can be utilized is virtually unlimited. Manual actuation, or a mechanized geartrain or kinematic device could be utilized. Hydraulic or pneumatic actuators could also be utilized.

Figure 4:
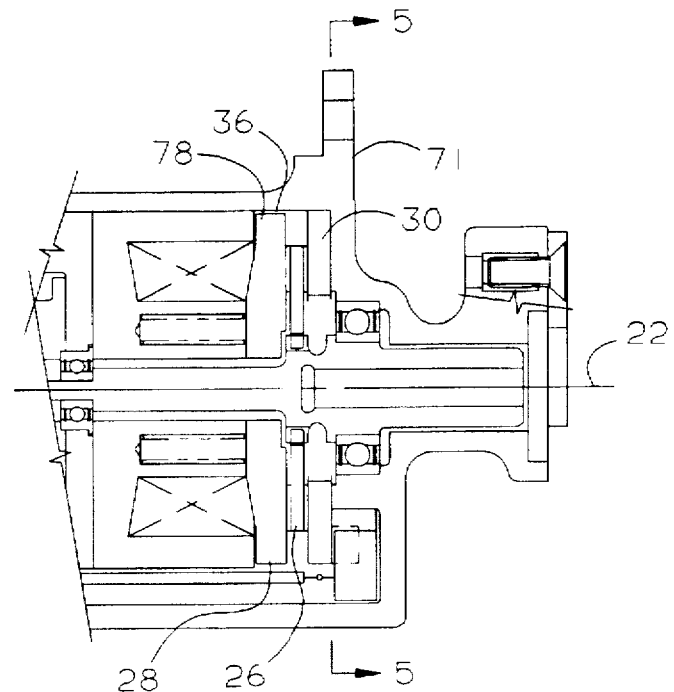
FIG. 4 is a longitudinal cross-sectional view of an alternate embodiment of a braking device including a brake monitoring device according to my invention.

The means for providing a calibrated relative rotation of the armature 28 with respect to the reaction plate 30 may be provided in a number of alternate embodiments. For example, as depicted in FIGS. 4 and 5, a pair of second lugs 66, 68 and a reference lug 70 may extend axially from the reaction plate 30 toward a housing 71 having a pair of recesses 72, 74 therein for receipt respectively of the second lugs 66 and 68. A pair of helical compression springs 76 may be provided on either side of each of the second lugs 66, 68, with each of the springs 76 having a first end operably disposed in contact with the recesses 72, 74 of the housing 71, and a second end operably connected to the second lugs 66, 68. The armature 28 in this embodiment is connected to the housing 71 by a spline or other such means, indicated at 78 in FIG. 4, allowing the armature 28 to move axially along, but not rotate about the axis 22. The reaction plate 30 in this embodiment is connected to the housing 71 in a manner preventing axial movement of the reaction plate, but allowing the reaction plate 30 to rotate about the axis 22 within the limits created by interaction of the second lugs 66, 68 with the recesses 72, 74 in the housing.

When the braking apparatus is applied, braking torque acting on the reaction plate 30 causes rotation of the reaction plate 30 about the axis 22 to generate a relative rotation between the reaction plate 30 and the armature 28 and housing 71. In the same manner as described above with respect to FIGS. 1–3, a proximity sensor 56 attached to the housing 71 is utilized to generate an output signal proportional to the relative motion of the reaction plate with respect to the armature 28 and housing 71.

Because springs 76 are provided on both sides of the second lugs 66, 68 of the exemplary embodiment depicted in FIGS. 4 and 5, the embodiment depicted therein can verify functional integrity of the braking apparatus 24 for rotation of the shaft 14 in either the clockwise or counterclockwise direction about the axis 22. While the ability to verify functional integrity in both rotational directions may be of value in some applications of my invention, it is contemplated that in many applications verifying braking torque in one direction of rotation will provide sufficient indication of the capability of the braking apparatus 24 to perform reliably for stopping or holding the shaft 14 against rotation in either direction.

In another alternate embodiment, also illustrated generally by FIGS. 4 and 5, the armature 28 is not connected to the housing 71 by a spline 71, but is piloted, as illustrated at 36, in the housing 71 in a manner allowing the armature 28 to rotate and move axially with respect to the housing 71 about and along the axis 22. In this embodiment of the invention, the relative rotation generated by the braking torque, and measured by the sensor 56, is between the reaction plate 30 and the housing 71. Methods similar to those previously described with respect to the embodiments depicted in FIGS. 1–5 may also be utilized with this embodiment of the invention. The difference with this embodiment, however, is that relative motion between the braking means 24, and specifically the reaction plate 30, will be measured relative to the housing 71, rather than relative to the armature 28 as in the embodiments previously described.

It is understood, therefore, that the spirit and scope of the appended claims should not be limited to the specific embodiments described and depicted herein.

I claim:

1. In a braking apparatus including a brake plate rotatable about an axis, an armature and a reaction plate directly adjacent and disposed on opposite sides of said brake plate, and actuator means for urging said armature to clamp said brake plate between said armature and said reaction plate in a manner generating braking torque acting on said brake plate with respect to said armature and reaction plate for resisting rotation of said brake plate, brake integrity monitoring means comprising:

means for providing a calibrated relative rotation of said armature with respect to said reaction plate about said axis in response to said braking torque acting on said brake plate when said actuator means are urging said armature to clamp said brake plate between said armature and said reaction plate; and means for measuring said calibrated relative rotation.

2. The braking apparatus of claim 1 wherein said means for providing a calibrated relative rotation includes spring means operatively connected for resisting relative rotation between said armature and said reaction plate.

3. The braking apparatus of claim 2 wherein said spring means are configured to provide a predetermined calibrated spring rate proportional to said relative rotation.

4. The braking apparatus of claim 2 wherein said spring means are configured to provide a predetermined spring rate calibrated to substantially preclude said relative rotation below a predetermined minimum braking torque acting on said brake plate with respect to said armature and reaction plate, and to limit said relative rotation at braking torques that are at or above said minimum braking torque.

5. In a braking apparatus including a brake plate rotatable about an axis, an armature and a reaction plate disposed on opposite sides of said brake plate, and actuator means for urging said armature to clamp said brake plate between said armature and said reaction plate in a manner generating a braking torque acting on said brake plate with respect to said armature and reaction plate for resisting rotation of said brake plate, brake integrity monitoring means comprising:

means for providing a calibrated relative rotation of said armature with respect to said reaction plate about said axis in response to said braking torque acting on said brake plate when said actuator means are urging said armature to clamp said brake plate between said armature and said reaction plate, said means for providing a calibrated relative rotation including spring means operatively connected for resisting relative rotation between said armature and said reaction plate, said spring means including a first end thereof operatively connected to said armature, and a second end thereof operatively connected to said reaction plate; and means for measuring said calibrated relative rotation.

6. The braking apparatus of claim 5 wherein:

said reaction plate includes a first lug extending axially from said reaction plate toward said armature;

said armature includes a second lug extending axially therefrom toward said reaction plate; and said spring means is a helical spring having said first end operatively attached to said first lug and a second end operatively connected to said second lug.

7. The braking apparatus of claim 5 wherein:

said reaction plate includes a pair of circumferentially spaced first lugs extending axially therefrom toward said armature;

said armature includes a second lug extending axially therefrom toward said reaction plate and disposed between said first lugs extending from said reaction plate; and said first end of said spring is operatively attached to one of said first lugs and said second end of said spring is operatively connected to said second lug in such a manner that said spring urges said second lug into contact with the other of said pair of first lugs when said actuator means is not urging said armature and reaction plate to clamp said brake plate;

said contact between said second lug and said other of said first lugs thereby defining an initial predetermined rotational reference position of said armature relative to said reaction plate.

8. The braking apparatus of claim 5 wherein said means for measuring relative rotation includes:

a proximity sensor operatively connected to be rotationally fixed with relation to said reaction plate; and a reference feature defined by said armature;

said proximity sensor providing an output signal proportional to the proximity of said reference feature to said sensor.

9. The braking apparatus of claim 5 wherein said means for measuring relative rotation includes:

a proximity sensor operatively connected to be rotationally fixed with relation to said armature; and a reference feature defined by said reaction plate;

said proximity sensor providing an output signal proportional to the proximity of said reference feature to said sensor.

10. The braking apparatus of claim 5 wherein said means for measuring a relative rotation includes initial positioning means for establishing an initial relative rotational reference position between said armature and said reaction plate.

11. The braking apparatus of claim 10 wherein said means for measuring relative rotation is configured to measure said relative rotation with respect to said reference position.

12. In a braking apparatus including a brake plate rotatable about an axis, an armature and a reaction plate disposed on opposite sides of said brake plate, and actuator means for urging said armature to clamp said brake plate between said armature and said reaction plate in a manner generating a braking torque acting on said brake plate with respect to said armature and reaction plate for resisting rotation of said brake plate, brake integrity monitoring means comprising:

means for providing a calibrated relative rotation of said armature with respect to said reaction plate about said axis in response to said braking torque acting on said brake plate when said actuator means are urging said armature to clamp said brake plate between said armature and said reaction plate;

means for measuring said calibrated relative rotation;

a support structure operably connected to said reaction plate in a manner preventing relative rotation of said reaction plate with respect to said support structure about said axis; and wherein said relative motion of said armature with respect to said reaction plate is measured by measuring relative rotation of said armature with respect to said support structure about said axis.

13. In a braking apparatus including a brake plate rotatable about an axis, an armature and a reaction plate disposed on opposite sides of said brake plate, and actuator means for urging said armature to clamp said brake plate between said armature and said reaction plate in a manner generating a braking torque acting on said brake plate with respect to said armature and reaction plate for resisting rotation of said brake plate, brake integrity monitoring means comprising:

means for providing a calibrated relative rotation of said armature with respect to said reaction plate about said axis in response to said braking torque acting on said brake plate when said actuator means are urging said armature to clamp said brake plate between said armature and said reaction plate;

means for measuring said calibrated relative rotation;

a support structure operably connected to said armature in a manner preventing relative rotation of said armature with respect to said support structure about said axis; and wherein said relative motion of said armature with respect to said reaction plate is measured by measuring relative rotation of said reaction plate with respect to said support structure about said axis.

14. A method for verifying the functional integrity of a braking device having a support structure, a braking apparatus operably attached thereto for applying a braking torque to a rotatable member mounted for rotation with respect to said support structure about an axis in a manner resisting rotation of said rotatable member about said axis, means for providing a calibrated relative rotation of said braking apparatus with respect to said support structure about said axis in response to said braking apparatus applying said braking torque to said rotatable member; and means for measuring said calibrated relative rotation, said method including the steps of:

a) applying said braking apparatus to resist rotation of said rotatable member relative to said support structure;

b) generating said braking torque and said calibrated relative rotational motion by applying sufficient torque to said rotatable member to rotate said rotatable member a predetermined rotational distance about said axis while said braking apparatus c) measuring said calibrated relative rotation to determine a measured value thereof; and d) comparing said measured value to a predetermined minimum reference value of said relative rotation corresponding to a minimum acceptable functional value of braking torque for said rotation of said rotatable member through said predetermined rotational distance.

15. In a braking device having a support structure and a braking apparatus operably attached thereto for applying a braking torque to a rotatable member mounted for rotation with respect to said support structure about an axis:

means for providing a calibrated relative rotation of said braking apparatus with respect to said support structure about said axis in response to said braking apparatus applying said braking torque to said rotatable member; and means for measuring said calibrated relative rotation;

wherein said braking apparatus includes:

a brake plate operably attached to said rotatable member in a manner to be rotatable therewith about said axis;

an armature and a reaction plate disposed on opposite sides of said brake plate; and actuator means for urging said armature to clamp said brake plate between said armature and said reaction plate in a manner generating a braking torque acting on said brake plate with respect to said armature and reaction plate for resisting rotation of said brake plate;

said means for measuring said relative rotation are operably connected between said reaction plate and said support structure for measuring relative rotation between said reaction plate and said support structure.

16. In a braking device having a support structure and a braking apparatus operably attached thereto for applying a braking torque to a rotatable member mounted for rotation with respect to said support structure about an axis:

means for providing a calibrated relative rotation of said braking apparatus with respect to said support structure about said axis in response to said braking apparatus applying said braking torque to said rotatable member; and means for measuring said calibrated relative rotation; wherein said braking apparatus includes:

a brake plate operably attached to said rotatable member in a manner to be rotatable therewith about said axis;

an armature and a reaction plate disposed on opposite sides of said brake plate; and actuator means for urging said armature to clamp said brake plate between said armature and said reaction plate in a manner generating a braking torque acting on said brake plate with respect to said armature and reaction plate for resisting torque of said brake plate; and said means for measuring said relative rotation are operably connected between said armature and said support structure for measuring relative rotation between said armature and said support structure.

17. In a braking device having a rotatable member mounted in a housing for rotation relative to said housing about an axis, a brake apparatus comprising:

a reaction plate disposed about said rotating member and operatively connected to said housing in a manner preventing said reaction plate from moving axially or rotating relative to said housing along or about said axis;

an armature disposed about said rotatable member and operably connected to said housing in a manner allowing the armature to rotate and move axially relative to said housing about on along said axis;

a brake plate axially disposed between said reaction plate and said armature, and operably connected to said rotatable member in a manner constraining said brake plate to rotate with said rotatable member but allowing said brake plate to move axially with respect to said rotatable member;

actuation means for urging said armature to move axially toward said reaction plate for clamping said brake plate between said reaction plate and said armature in a manner generating a braking torque acting on said brake plate with respect to said armature;

means for providing a calibrated relative rotation of said armature with respect to said reaction plate about said axis in response to said braking torque acting on said brake plate when said actuator means are urging said armature to clamp said brake plate between said armature and said reaction plate; and means for measuring said calibrated relative rotation;

said means for providing calibrated relative rotation comprising:

a pair of circumferentially spaced first lugs extending axially from said reaction plate toward said armature;

a second lug extending axially from said armature toward said reaction plate and disposed between said first lugs extending from said reaction plate; and spring means operatively connected for resisting relative motion between said armature and said reaction plate;

said spring means having a predetermined calibrated spring rate proportional to said relative rotation;

said spring having a first end thereof operatively attached to one of said first lugs and a second end thereof operatively connected to said second lug in such a manner that said spring urges said second lug into contact with the other of said pair of first lugs when said actuator means is not urging said armature and reaction plate to clamp said brake plate;

said contact between said second lug and said other of said first lugs thereby defining an initial predetermined rotational reference position of said armature relative to said reaction plate;

said means for measuring relative position comprising:

a proximity sensor operatively connected to said housing be rotationally and axially fixed with relation to said housing and reaction plate; and a position sensor reference lug extending axially from said armature toward said reaction plate;

said proximity sensor providing an output signal proportional to the proximity of said reference lug to said sensor.

18. A method for verifying functional integrity of a braking apparatus including a rotatable member having a brake plate operably attached thereto for rotation therewith about an axis, an armature and a reaction plate disposed on opposite sides of said brake plate, actuator means for urging said armature to clamp said brake plate between said armature and said reaction plate in a manner generating a braking torque acting on said brake plate with respect to said armature and reaction plate for resisting rotation of said brake plate, and means for providing a calibrated relative rotation of said armature with respect to said reaction plate about said axis in response to said braking torque acting on said brake plate when said actuator means are urging said armature to clamp said brake plate between said armature and said reaction plate, said method including the steps of:

a) rotating said rotatable member about said axis at a predetermined rotational speed;

b) applying said brake, to generate said braking torque and said calibrated relative rotational motion, by causing said actuator to clamp said brake plate between said armature and said reaction plate;

c) measuring said calibrated relative rotation to determine a measured value thereof; and d) comparing said measured value to a predetermined minimum reference value of said relative rotation corresponding to a minimum acceptable functional value of braking torque at said predetermined rotation speed of said rotatable member.

19. A method for verifying functional integrity of a braking apparatus including a rotatable member having a brake plate operably attached thereto for rotation therewith about an axis, an armature and a reaction plate disposed on opposite sides of said brake plate, actuator means for urging said armature to clamp said brake plate between said armature and said reaction plate in a manner generating a braking torque acting on said brake plate with respect to said armature and reaction plate for resisting rotation of said brake plate, and means for providing a calibrated relative rotation of said armature with respect to said reaction plate about said axis in response to said braking torque acting on said brake plate when said actuator means are urging said armature to clamp said brake plate between said armature and said reaction plate, said method including the steps of:

a) applying said brake by causing said actuator to clamp said brake plate between said armature and said reaction plate;

b) generating said braking torque and said calibrated relative rotational motion by applying sufficient torque to said rotatable element to rotate said brake plate a predetermined rotational distance about said axis while said brake plate is clamped between said armature and reaction plate by said actuator means;

c) measuring said calibrated relative rotation to determine a measured value thereof; and d) comparing said measured value to a predetermined minimum reference value of said relative rotation corresponding to a minimum acceptable functional value of braking torque for said rotation of said brake plate through said predetermined rotational distance.

20. A method for the verifying functional integrity of a braking device having a support structure, a braking apparatus operably attached thereto for applying a braking torque to a rotatable member mounted for rotation with respect to said support structure about an axis in a manner resisting rotation of said rotatable member about said axis, means for providing a calibrated relative rotation of said braking apparatus with respect to said support structure about said axis in response to said braking apparatus applying said braking torque to said rotatable member, and means for measuring said calibrated relative rotation, said method including the steps of:

a) rotating said rotatable member about said axis at a predetermined rotational speed;

b) applying said braking apparatus to generate said braking torque and said calibrated relative rotational motion, by resisting rotation of said rotatable member relative to said support structure;

c) measuring said calibrated relative rotation to determine a measured value thereof; and d) comparing said measured value to a predetermined minimum reference value of said relative rotation corresponding to a minimum acceptable functional value of braking torque at said predetermined rotation speed of said rotatable member.

* * * * *